US009520241B2

(12) United States Patent
Xie (10) Patent No.: US 9,520,241 B2
(45) Date of Patent: Dec. 13, 2016

(54) GRAPHENE SUPPORTED VANADIUM OXIDE MONOLAYER CAPACITOR MATERIAL AND METHOD OF MAKING THE SAME

(71) Applicant: Indiana University Research and Technology Corporation, Indianapolis, IN (US)

(72) Inventor: Jian Xie, Carmel, IN (US)

(73) Assignee: Indiana University Research and Technology Corporation, Indianapolis, IN (US)

(*) Notice: Subject to any disclaimer, the term of this patent is extended or adjusted under 35 U.S.C. 154(b) by 0 days.

(21) Appl. No.: 14/850,118

(22) Filed: Sep. 10, 2015

(65) Prior Publication Data

US 2016/0189882 A1 Jun. 30, 2016

Related U.S. Application Data

(63) Continuation-in-part of application No. 13/664,847, filed on Oct. 31, 2012, now abandoned.

(51) Int. Cl.
| | |
|---|---|
| H01G 11/32 | (2013.01) |
| H01G 11/26 | (2013.01) |
| H01G 11/86 | (2013.01) |
| H01G 11/46 | (2013.01) |
| H01G 11/68 | (2013.01) |
| H01G 11/36 | (2013.01) |

(52) U.S. Cl.
CPC .............. *H01G 11/32* (2013.01); *H01G 11/26* (2013.01); *H01G 11/46* (2013.01); *H01G 11/68* (2013.01); *H01G 11/86* (2013.01); *H01G 11/36* (2013.01); *Y02E 60/13* (2013.01); *Y02T 10/7022* (2013.01)

(58) Field of Classification Search
None
See application file for complete search history.

(56) References Cited

U.S. PATENT DOCUMENTS

| | | |
|---|---|---|
| 2008/0192407 A1 | 8/2008 | Lu et al. |
| 2009/0246625 A1 | 10/2009 | Lu |
| 2010/0081057 A1 | 4/2010 | Liu et al. |
| 2011/0033746 A1 | 2/2011 | Liu et al. |
| 2011/0045347 A1 | 2/2011 | Liu et al. |
| 2011/0183180 A1 | 7/2011 | Yu et al. |
| 2011/0205688 A1 | 8/2011 | Ray et al. |

(Continued)

OTHER PUBLICATIONS

M. Sathiya,A. S. Prakash,K. Ramesha,J M. Tarascon, and A. K. Shukla V2O5-Anchored Carbon Nanotubes for Enhanced Electrochemical Energy Storage Sep. 2, 2011 American Chemical Society.

(Continued)

*Primary Examiner* — Dion R Ferguson
(74) *Attorney, Agent, or Firm* — C. John Brannon; Brannon Sowers & Cracraft PC (57) ABSTRACT

An method of producing an electronic device, including identifying a graphene sheet, functionalizing the graphene sheet to yield a functionalized sheet, attaching respective vanadium oxide molecules to respective functional groups to define an impregnated graphene sheet, removing organic solvents from the impregnated graphene sheet to define a composite sheet, and positioning the composite sheet onto a metallic substrate to yield a capacitor.

17 Claims, 6 Drawing Sheets

(56) References Cited

U.S. PATENT DOCUMENTS

| | | |
|---|---|---|
| 2011/0235240 A1 | 9/2011 | Lu et al. |
| 2011/0281174 A1 | 11/2011 | Seymour |
| 2012/0321953 A1* | 12/2012 | Chen ................ B82Y 30/00 |
| | | 429/219 |
| 2013/0171502 A1* | 7/2013 | Chen ................ H01G 11/06 |
| | | 429/149 |
| 2013/0273431 A1* | 10/2013 | Xie ................ H01M 4/131 |
| | | 429/231.5 |

OTHER PUBLICATIONS

Ajayan et al. "Structure of carbon nanotube-based nanocomposites," J. Microscopy, 275-282 (1997).

* cited by examiner

Fig. 3

Carbon　　　Diazonium Salt　　　Functionalized Carbon

GRAPHENE SUPPORTED VANADIUM OXIDE MONOLAYER CAPACITOR MATERIAL AND METHOD OF MAKING THE SAME

CROSS REFERENCE TO RELATED APPLICATIONS

This application is a continuation-in-part of, and claims priority to, co-pending U.S. patent application Ser. No. 13/664,847, filed on Oct. 31, 2012.

TECHNICAL FIELD

The novel technology relates generally to the field of electronic materials, and, more particularly, to a high capacitance material including alternating vanadium oxide monolayers or multilayers, each supported by a single graphene sheet substrate.

BACKGROUND

Supercapacitors are useful for many applications because of their high power density, long cycle life and the potential applications on both military and commercial devices. For example, supercapacitors are important to the designs of portable laser systems and electric vehicles. Two mechanisms are associated with energy storage in a supercapacitor, namely electrical double layer charge storage and pseudo-capacitance charge storage. The capacitance of the former comes from the charge accumulation at the electrode/electrolyte interface, and therefore highly depends on the pore structure of the electrode, including such parameters as pore size and accessible surface area to the electrolyte molecules. The latter capacitance mechanism arises from to the fast reversible faradic transitions (electrosorption or surface redox reactions) of the electro-active species of the electrode, including surface functional groups, transition metal oxides and conducting polymers and this type of supercapacitor is also called electrochemical supercapacitors. The pseudo-capacitance from reversible faradic reactions of an electro-active material offers a higher power storage capacity than the electrical double layer capacitance mechanism.

Transition metal oxides have typically been considered to have a great potential to increase the capacitance in the electrochemical supercapacitors. Amorphous hydrated $RuO_2$ has attracted particular interest as a supercapacitor electrode material with a capacitance over 700 F/g having been achieved, significantly higher than that has been observed with an electrical double layer capacitor. Unfortunately, hydrated $RuO_2$ is too rare and expensive to be commercially viable as a supercapacitor material. Supercapicitors utilizing nano-crystalline vanadium nitride materials have exhibited capacitance of 1340 F/g at a 2 mV/s scan rate, which is far more than that of the hydrated $RuO_2$ based supercapacitors. Such a high capacitance is believed to be caused by a series of reversible redox reactions on few atomic layers of vanadium oxide on the surface of the underlying nitride nanocrystals, which exhibit a metallic electronic conductivity ($\sigma_{bulk}$=1.67×10$^6$Ω$^{-1}$ m$^{-1}$).

Thus, there remains a need to supercapacitor material having even higher capacitance and using more readily available materials. The present invention addresses this need.

SUMMARY

The present novel technology relates to energy storage devices supporting vanadium oxide dielectric layers on graphene substrates.

One object of the present novel technology is to provide an improved capacitor device. Related objects and advantages of the present novel technology will be apparent from the following description.

DESCRIPTION OF THE PREFERRED EMBODIMENTS

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

As illustrated in FIGS. 1-6, the present novel technology relates to capacitors, specifically capacitor devices 10 with nano-structured vanadium oxide molecules present as thin, ultrathin, or mono-layers 15 and supported on electrically conductive, typically carbonaceous, support structures 20. The carbonaceous support structure is typically one or more graphene sheets, although other morphologies of carbon, such as diamond, may be used. Such capacitors 10 may approach an extremely high theoretical capacitance of 4577 F/g and exhibit high electric conductivity and a low time constant. In contrast, the current state-of-art capacity of $RuO_2$ is only 700 F/g. The instant capacitors 10 represent a significant increase in supercapacitor energy storage for high power density applications, such as laser systems and electric vehicle (EV)/hybrid electric vehicle (HEV) systems.

Figure 1:
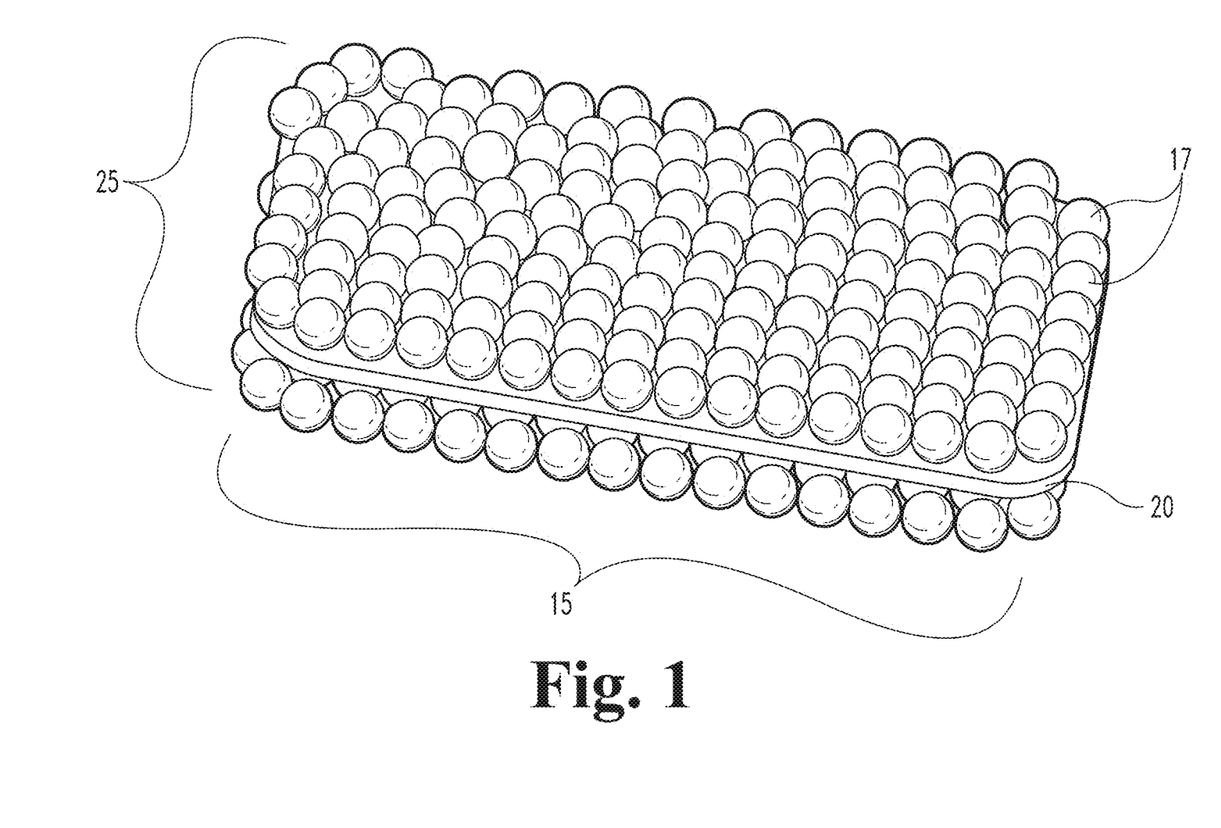
FIG. 1 graphically illustrates a graphene/vanadium oxide composite dielectric material according to a first embodiment of the present novel technology, having vanadium oxide molecular monolayers connected to both sides of a graphene sheet.

The thin layer or, typically, monolayer 15 of vanadium oxide molecules 17 supported on a graphene substrate 20 defines a $V_2O_5$/graphene composite 25. The structure of the composite 25 allows respective vanadium oxide ($V_2O_5$) molecules to avail themselves to electrolytes with high surface area accessibility for ions in the electrolytes, which in turn allows each $V_2O_5$ molecule to participate in the redox reaction and facilitates the fast mass transport of ions. The high capacitance of the composite material 25 appears to arise from the 3-electron redox reactions of vanadium oxide ($V_2O_5$) ($V^{5+} \rightarrow V^{4+}+1e^-$; $V_{4+} \rightarrow V_{3+}+1e^-$; and $V^{3+} \rightarrow V^{2+}+1e^-$). The $V_2O_5$ molecules in the monolayer 15 may directly electrically communicate with the carbon atoms in the graphene layer 20. Consequently, the electron transfers in the $V_2O_5$/graphene composite 25 primarily involve the direct transfer of electrons from the carbon atoms to the $V_2O_5$ molecules. Alternately, carbon spacers (such as amorphous carbon, diamond, graphite, partially graphitized carbon, and combinations thereof) or the like may be positioned between the graphene substrate layers 20 and/or the substrate layers 20 and the vanadium oxide layer 15. The slow electron transfer between $V_2O_5$ molecules (which causes the extremely low electronic conductivity, $8.7 \times 10^{-7}$ S cm$^{-1}$, and, consequently, limits the application of vanadium oxide in supercapacitors requiring low time constant) is thus minimized or eliminated. Accordingly, the electronic conductivity of $V_2O_5$/graphene composite 25 is greatly increased, resulting in a greatly reduced the time constant. In addition, the positioning of the $V_2O_5$ monolayer 15 on graphene 20 provides a very high mass ratio of active material to supporting material, typically at least 3:1, and more typically 3.83:1 ($V_2O_5$:graphene=3.83:1), which is typically about fifteen times that of vanadium oxide/vanadium nitrides composites ($V_2O_5$/VN) ($V_2O_5$:VN=0.251). Vanadium oxide benefits from an electrically conducting support due to its low electronic conductivity, and the single carbon layer of graphene 20 is ideal, providing carbon support with minimized space constraints.

Figure 2:
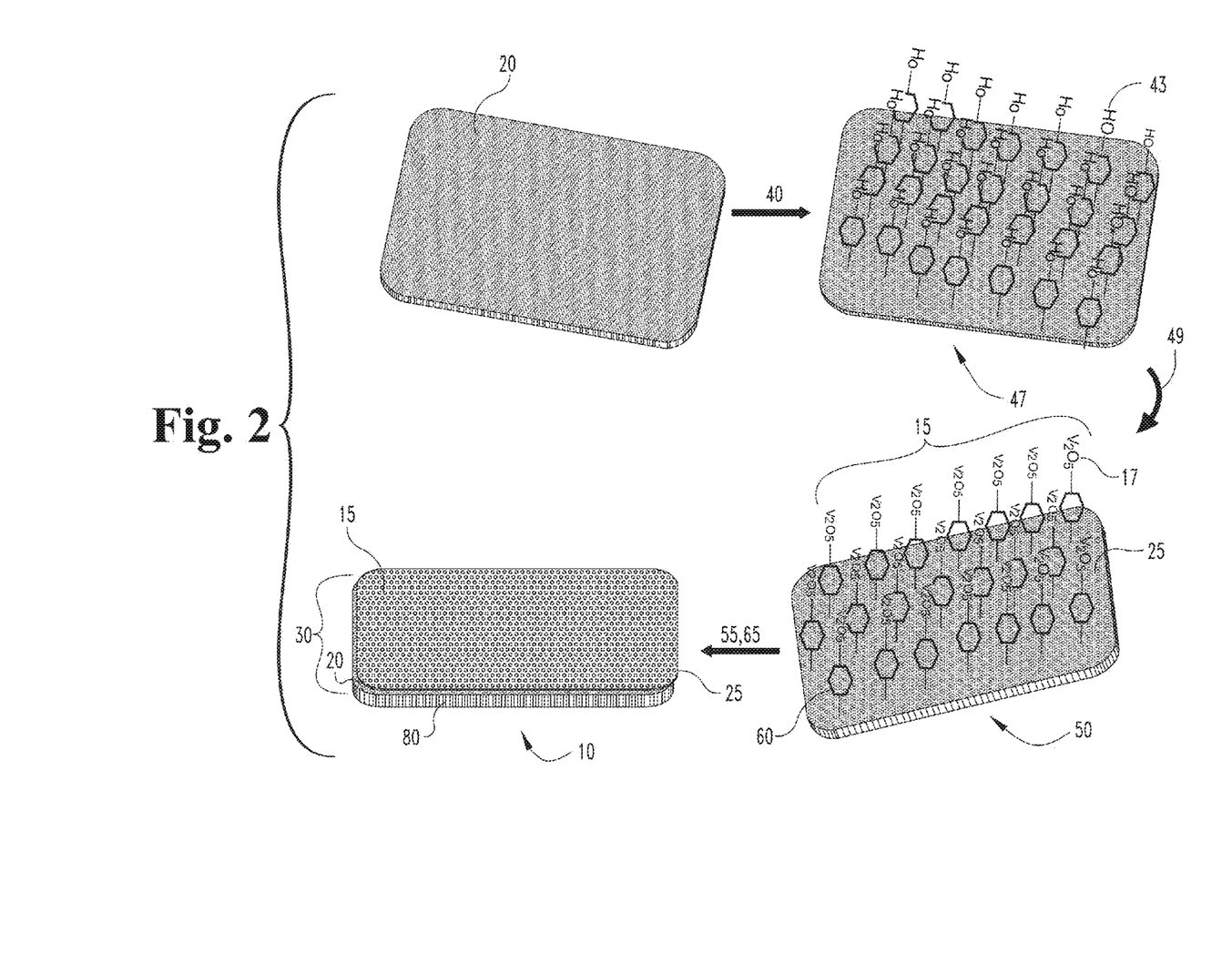
FIG. 2 graphically illustrates the process of attaching vanadium oxide layers to functionalized graphene according to a second embodiment of the present novel technology.
Figure 3:
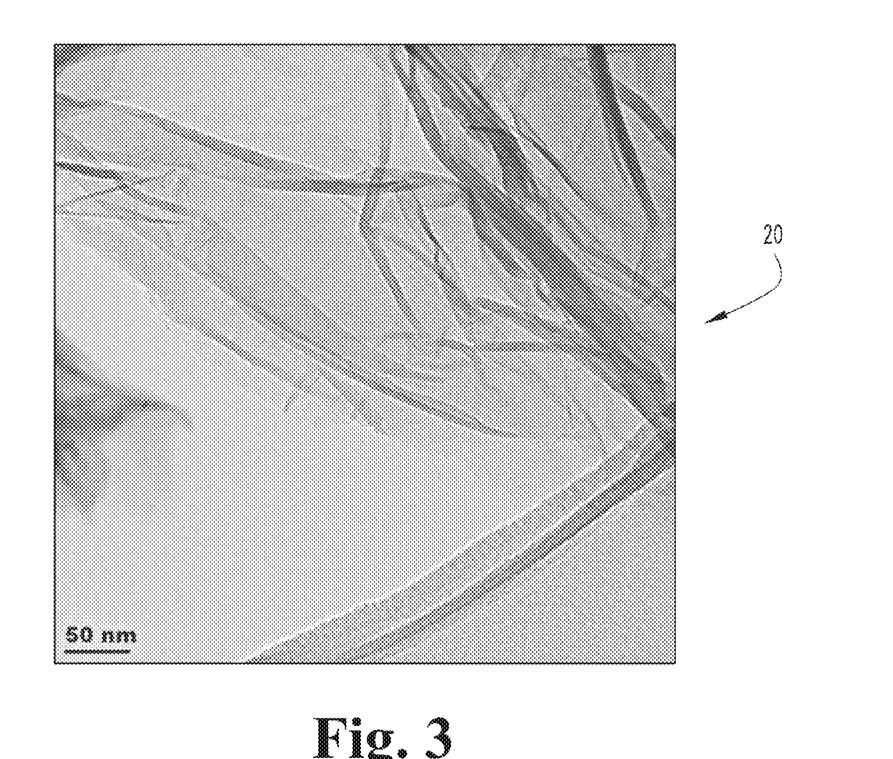
FIG. 3 is a photomicrograph of graphene as synthesized through thermal expansion according to the embodiment of FIG. 2.

The nano-structured vanadium oxide monolayer 15 is formed and supported on graphene 20, and a thin film electrode 30 is typically fabricated thereupon to allow each $V_2O_5$/graphene composite sheet 25 to enjoy good electric communication or conduction. The synthesis of nano-structured vanadium oxide monolayer 15 supported on graphene 20 is typically achieved through the functionalization 40 of the graphene sheet 20 and the subsequent removal of benzene rings or the like from the functionalized graphene 20, following the attachment of vanadium ions/vanadium oxide monolayer 15 on the graphene substrate 20.

Figure 4:
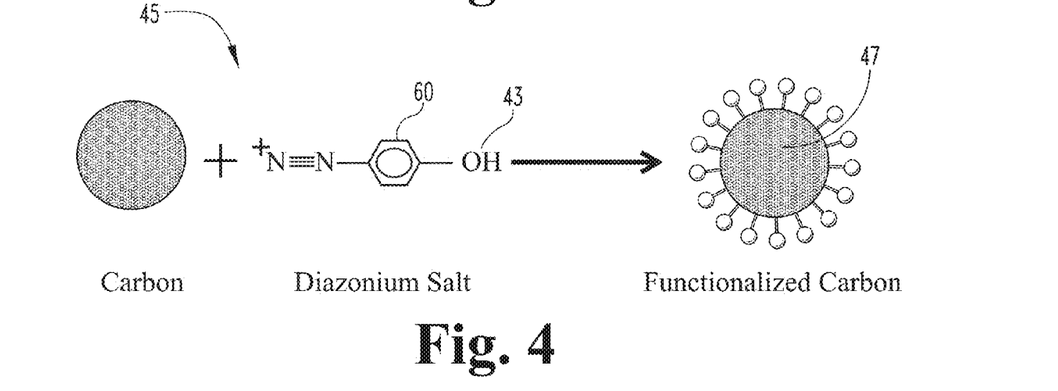
FIG. 4 schematically illustrates the functionalization of a carbon atom according to the embodiment of FIG. 2.
Figure 5:
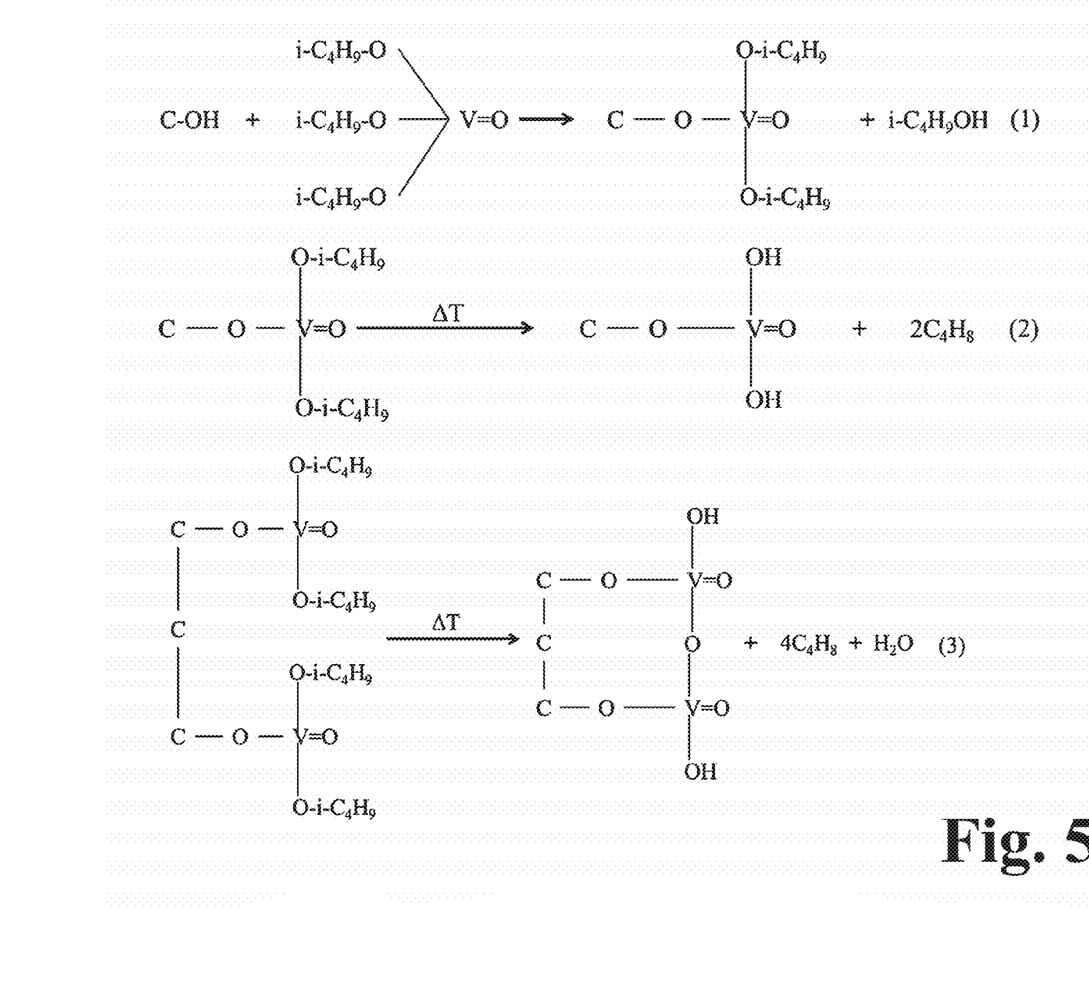
FIG. 5 chemically illustrates the process of FIG. 1.
Figure 6:
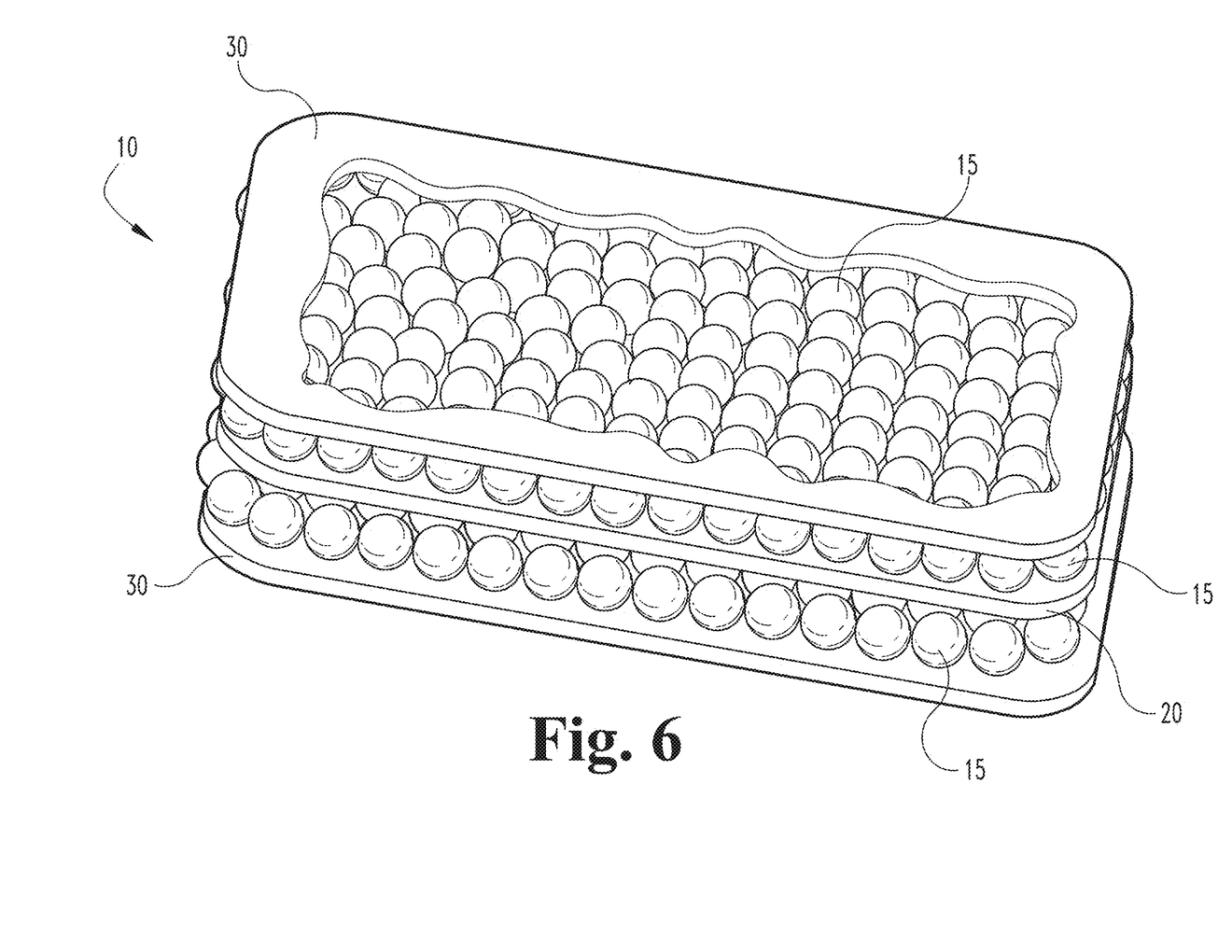
FIG. 6 graphically illustrates a capacitor according to a third embodiment of the present novel technology.

Graphene, a single-atom-thick sheet of hexagonally arrayed sp2-bonded carbon atoms, is a two-dimensional macromolecule exhibiting extremely high surface area (2600 m$^2$/g). The in-plane electronic conductivity ($10^9 \Omega^{-1}$ m$^{-1}$) of graphene is much higher than that of the vanadium nitride. Single sheet graphene 20 is a very good candidate for support of the vanadium oxide monolayer 15, as it has both good in-plane electrical conductivity as well as physical strength, as the in-plane carbon-carbon bonds are stronger than those in diamond. Graphene sheets 20 may be synthesized, such as by the thermal expansion method or the like, and hydroxyl groups (—OH) 43 may be chemically attached to the surface of graphene 20 through the diazonium reaction 45. The attachment 49 of a vanadium oxide layer 15 onto the functionalized graphene 47 is typically carried out by a hydrothermal technique, such as has been used to produce vanadium oxide monolayer on alumina, silica, magnesia, and titania supports. Vanadium ions may be attached to the functionalized graphene-OH 47 by impregnation of the same with vanadyl triisobutoxide, and then typically purified such as by vacuum distillation (typically b.p. 414-415 K at 1.07 kPa). The use of an isobutyl alcohol derivative of vanadium offers the advantage of a monomeric nature, as compared to the methoxide. Alternately, the vanadium oxide layer 15 may be deposited 49 by other convenient means, such as atomic layer deposition or the like. The functionalized graphene 47 is then typically impregnated with a solution of vanadyl triisobutoxide in anhydrous nhexane. After a predetermined period of time (typically about 24 hours) the solution is removed and the mixture is washed, typically several times, with solvent. The impregnated graphenes 50 are subsequently calcined 55 for a predetermined period of time (typically several hours, more typically about three hours) at elevated temperatures (typically, about 300° C.) in a stream of dry air to form the vanadium oxide monolayer 15 on graphene 20. In this calcination step 55, organic solvents 60 such as benzene and the like are removed and the vanadium oxide monolayer 15 is directly formed on the graphene substrate surface 20. The composite sheets 25 may then be then positioned 65 onto a (typically metallic) substrate 80. The reaction scheme is shown in FIGS. 2, 4 and 5.

Figure 7:
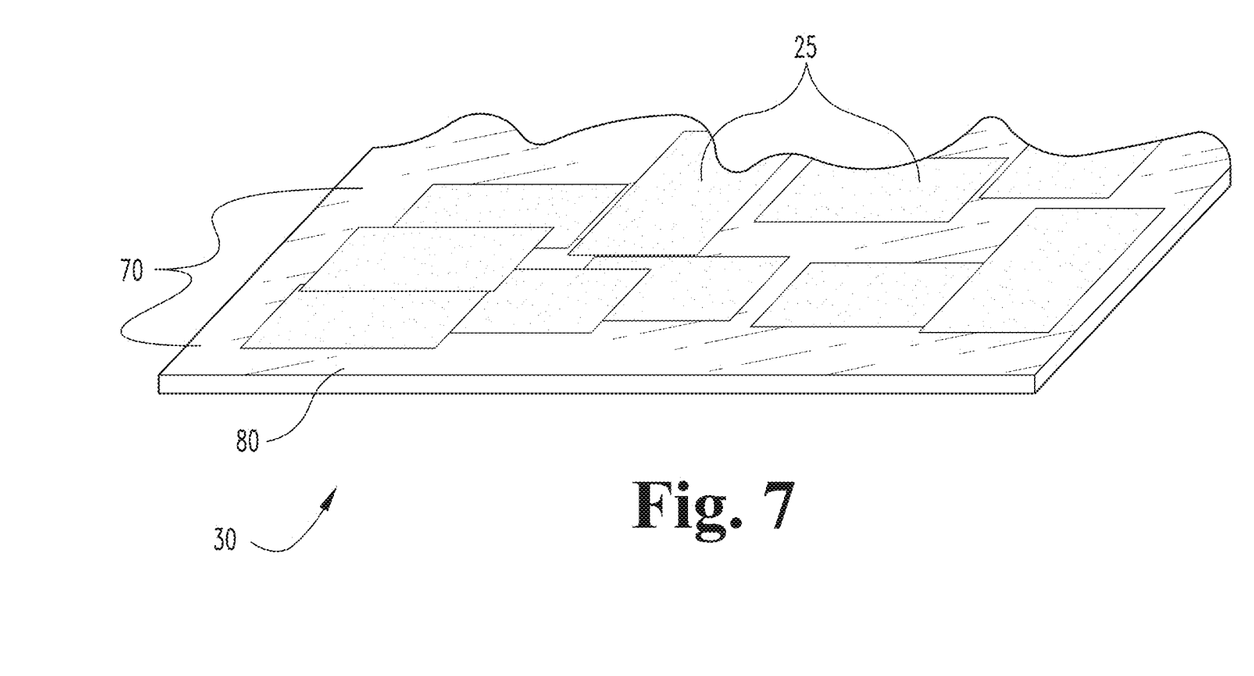
FIG. 7 is a partial perspective view of a plurality of composite sheets on a metallic substrate defining a thin layer.

To make the high performance capacitor 10 characterized by extremely high capacitance, each vanadium oxide monolayer 15/graphene sheet 20 in the electrode layer 30 typically participates in the charging/discharging process. This participation arises because the electronic conduction between each vanadium oxide monolayer 15/graphene sheet 20 is maintained. Such conduction may benefit from the provision of an appropriately conductive electrode layer 30 structure. The structure of the desired electrode layer 30 typically has the graphene edges of vanadium oxide monolayer/graphene sheet composite 25 physically in contact with each other, or contacting through conductive metal substrates. For example, the synthesized vanadium oxide monolayer/graphene composites 25 may be dispersed in organic solvents along with a binder to form a uniform dispersion. This dispersion may then be coated 65 onto a nickel substrate 80 to form a thin layer 70 of composite sheets 25, each sheet 25 in metallic contact with another sheet 25 and/or the nickel substrate 80.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A capacitor, comprising:
   a plurality of hydroxyl functionalized graphene sheets defining a stack;
   a plurality of $V_2O_5$ molecules individually bonded a each respective hydroxyl functionalized graphene sheet and defining a $V_2O_5$ monolayer, each respective $V_2O_5$ monolayer bonded to a respective hydroxyl functionalized graphene sheet;
   at least one metallic electrode connected in electric communication to the stack;
   wherein each respective $V_2O_5$ monolayer is disposed between two respective graphene sheets;
   wherein each respective graphene sheet is an atomic monolayer;
   wherein the mass ratio of graphene to $V_2O_5$ in the stack is greater than 3.

2. The capacitor of claim 1 and further comprising a plurality of carbon spacers disposed on each respective graphene sheet.

3. The capacitor of claim 2 wherein the carbon spacers are amorphous carbon.

4. The capacitor of claim 2 wherein the carbon spacers are diamond.

5. The capacitor of claim 1 wherein the mass ratio of graphene to $V_2O_5$ in the stack is about 3.8.

6. A method of producing an electronic device, comprising:
   a) identifying a graphene sheet;
   b) functionalizing the graphene sheet to yield a functionalized sheet;
   c) attaching respective vanadium oxide molecules to respective functional groups to define an impregnated graphene sheet;
   d) removing organic solvents from the impregnated graphene sheet to define a composite sheet; and
   e) positioning the composite sheet onto a metallic substrate to yield a capacitor.

7. The method of claim 6 wherein during step a), a plurality of graphene sheets are identified; wherein during step b) a plurality of functionalized sheets are yielded; wherein during step c), a plurality of impregnated graphene sheets are defined; wherein during step d), a plurality of composite sheets are defined; and wherein during step e), a plurality of composite sheets are positioned onto the metallic substrate to yield a capacitor.

8. The method of claim 7 wherein step b) includes a diazonium reaction.

9. The method of claim 7 wherein step d) includes calcining.

10. The method of claim 7 wherein the graphene sheet is an atomic monolayer.

11. The method of claim 7 wherein the functionalized sheet is functionalized with hydroxyl groups.

12. The method of claim 7 and further comprising:
    f) positioning a plurality of carbonaceous spacers onto the graphene sheet.

13. The method of claim 12 wherein the carbonaceous spacers are amorphous.

14. The method of claim 12 wherein the carbonaceous spacers are diamond.

15. The method of claim 12 wherein the vanadium oxide molecules define a monolayer on the capacitor.

16. A method for manufacturing a supercapacitor, comprising:
    a) identifying a plurality of graphene sheets;
    b) functionalizing the respective graphene sheets with a diazonium reaction to yield a plurality of hydroxyl-functionalized sheets;
    c) attaching respective vanadium oxide molecules to respective hydroxyl functional groups to yield a plurality of impregnated graphene sheets;
    d) calcining the plurality of impregnated graphene sheets to remove organic solvents therefrom;
    e) bonding the vanadium oxide molecules directly to the respective graphene sheets to yield a plurality of composite sheets; and
    f) positioning the respective composite sheets in electric communication with each other and/or a metallic substrate to yield a capacitor.

17. The method of claim 16 and further comprising:
    before performing f), g) dispersing the plurality of composite sheets in an organic solvent;
    wherein step f) includes coating the dispersion onto a metallic substrate to form a thin layer.

* * * * *